United States Patent Office 3,488,092
Patented Jan. 6, 1970

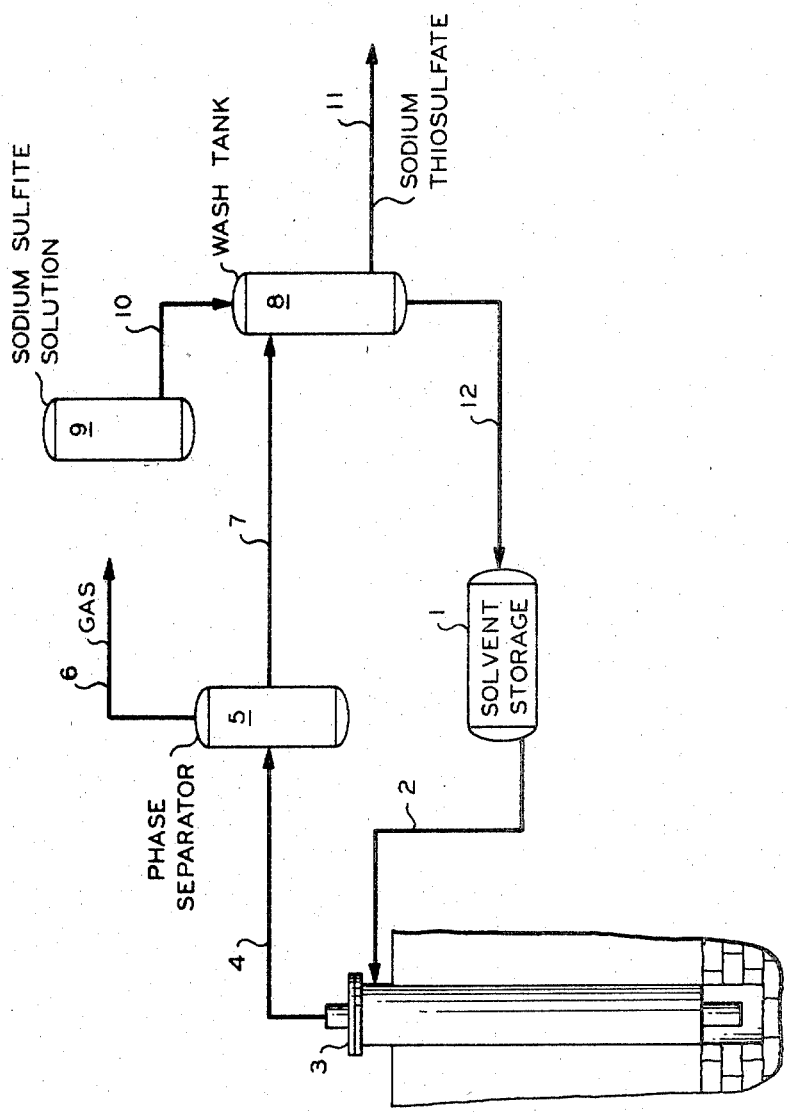

3,488,092
METHOD FOR PRODUCING ACID-GAS WELL CONTAINING SULFUR
Maurice R. Dean and Henry B. Fisher, Bartlesville, Okla., assignors to Phillips Petroleum Company, a corporation of Delaware
Filed Dec. 18, 1967, Ser. No. 691,501
Int. Cl. E21c 41/14
U.S. Cl. 299—5     5 Claims

ABSTRACT OF THE DISCLOSURE

A gas well which can produce hydrogen sulfide and in which sulfur tends to plug piping is treated by circulating therein a medium or solvent which removes sulfur which is carried to the surface in the medium. The medium is treated at the surface to recover therefrom the sulfur and hydrogen sulfide dissolved therein. The solvent or medium can be an aromatic selected from benzene, toluene, thiobenzene, diphenyl and their halogen substituted derivatives. Such an organic liquid can be the sole medium used in the well. Mixtures can be used. Or, the medium can be an aqueous alkali metal sulfite or bisulfite admixed with some alkali metal hydroxide. When sulfite and hydroxide are used in the well, the sulfur reacts to form $Na_2S_2O_3$, sodium thiosulfate and the $H_2S$ reacts with the hydroxide to form $Na_2S$ or $NaHS$. When the organic solvent is used to separate sulfur from the gas in the well and the solvent is treated at the surface, the use of alkali metal hydroxide can be avoided provided the $H_2S$ is removed or neutralized and sulfite will react to form the thiosulfite. Gases are separated from the medium or solvent at the surface prior to further treatment of the medium or solvent as described.

---

This invention relates to the production of a sour gas well which produces sulfur comingled with a gas. In one of its aspects, it relates to a method for producing such a gas well while preventing plugging by sulfur.

In one concept of the invention it provides a method for removing sulfur which is comingled with the gas in a producing gas well to prevent plugging thereof by circulating into and from said well a solvent in which the sulfur will dissolve, e.g., and aromatic solvent such as benzene. In another of its concepts, the invention provides such a method in which the solvent or medium for removing the sulfur can consist of an aqueous alkali metal sulfite or bisulfite admixed with alkali metal hydroxide. In a further concept of the invention, it provides a method in which the medium or solvent which has been used to treat the well is further treated at the surface as by removing gas therefrom and then treating the solvent. For example, the solvent containing the sulfur can be treated with reagent to form thiosulfate which can be extracted or separated from the solvent which has been employed.

In a typical hydrogen sulfide gas well, it is possible to obtain enough acid-gas to produce to the order of 90 to 100 tons per day of sulfur. Such a well would be flowing 4,000 M c.f.d. of gas containing about 70 percent $H_2S$.

This gas will contain elemental sulfur and it is this sulfur which is being recovered along with the acid-gas.

Certain underground formations produce a gas which contains elemental sulfur in solution. Such wells are often difficult to produce continuously because the sulfur comes out of the solution in the producing pipe or pipes and prevents the gas flow. Indeed, the sulfur collects on the pipe walls until at some point it completely fills the pipe.

It is an object of this invention to provide a method for producing a gas well. It is another object of this invention to provide a method for removing sulfur from a gas well containing the same. It is a further object of this invention to provide a method for the converting of sulfur in a gas well and to remove it from the well in converted state. It is a further object of this invention to provide a method for the treatment of a well to remove sulfur therefrom and employing a solvent and to provide for treatment of said solvent. It is a still further object of this invention to provide for the recovery of gas and sulfur from a well containing the same.

Other aspects, concepts and objects of the invention are apparent from a study of this disclosure, the drawing and the appended claims.

According to the present invention there is provided a method for the removal of gas and sulfur from a well containing the same, the sulfur tending otherwise to plug the well or to interfere with the operation thereof, which comprises injecting a solvent or medium into the well, recovering the solvent or medium from the well and treating the solvent or medium at the surface to separate gas and sulfur therefrom.

In a specific embodiment of the invention an aromatic solvent such as benzene is introduced into the well wherein sulfur is dissolved therein. The solvent with the dissolved sulfur therein is removed from the well and subjected to gas separation following which the solvent is treated to recover sulfur therefrom so that the solvent may be reused as desired. In a specific embodiment of the invention when the solvent used has been an organic liquid, such as an aromatic compound, e.g., benzene, the liquid can be treated with sodium sulfite in aqueous solution, thus extracting sulfur from the solvent. Sodium thiosulfate thus formed is not soluble in the solvent which can be separated and reused.

Referring now to the drawing, the solvent in the embodiment now being described, being benzene, is pumped from solvent storage 1 by pipe 2 into well 3. In the well the solvent dissolves sulfur and thus prevents plugging of pipes. A stream of solvent containing gas and sulfur dissolved therein is recovered from the wall via pipe 4 and passed to gas-oil separator 5 from which gas is taken off at 6, leaving solvent containing dissolved sulfur therein, removed from separator 5 by pipe 7 to wash tank 8 wherein the solvent is intimately intermingled with sodium sulfite solution 9, passed to the wash tank by pipe 10. A sodium thiosulfate solution is removed by pipe 11 while clean solvent is returned to solvent storage by way of pipe 12.

The following is a specific example showing the extraction of sulfur from benzene by an aqueous solution of sodium sulfite.

EXAMPLE I

Extraction of sulfur from benzene by an aqueous solution of $Na_2SO_3$ 150 ml. benzene in which is dissolved 6.43 gas sulfur (roughly 15 lbs. sulfur per bbl. of benzene) is contacted at 160° F. with an aqueous solution containing 40 grams $Na_2SO_3$ dissolved in 150 ml. water. The mixture was stirred slowly at 160° F. and periodic samples taken of the benzene phase. The benzene samples were analyzed for weight percent sulfur by evaporating the benzene from weighted samples. The following results were obtained:

| Sample Number: | Contact Time (hrs. at 160° F.) | Percent Sulfur in Benzene |
|---|---|---|
| 1 | 0 | 4.71 |
| 2 | 0.5 | 4.67 |
| 3 | 1.0 | 4.67 |
| 4 | 2.0 | 4.67 |
| 5 | 4.0 | 4.05 |
| 6 | [1] 18.0 | 0.01 |

[1] With Triton X-405 a surface active agent, the extraction would be completed in about 7 hours.

The last column shows that sulfur is being extracted from the benzene solution in contact with the aqueous $Na_2SO_3$. The presumed reaction is:

$$Na_2SO_3 + S = Na_2S_2O_3 \text{ (in water phase)}$$

Separate tests have shown that $Na_2SO_3$ and $Na_2S_2O_3$ are not soluble in benzene.

EXAMPLE II

Benzene is circulated at a rate of 500 bbls. of benzene per million s.c.f. of produced gas. The reservoir gas contains 7500 lbs. elemental sulfur per million s.c.f. of gas. The benzene dissolves the elemental sulfur and the sulfur concentration in the benzene is approximately 15 lbs. sulfur/bbl. of benzene. The benzene containing the sulfur is produced along with the gas. It is separated from the gas phase and then passed through a scrubber containing an aqueous solution of $Na_2SO_3$. The sulfur is removed from the benzene by reaction of the sulfur with $Na_2SO_3$ to form $Na_2S_2O_3$, the latter appearing in the water phase.

That operation of the invention is now preferred in which benzene is used in the well and the sulfite is used to treat the benzene containing the sulfur at the surface; that is, after the solvent has been removed from the well.

Since benzene is now the preferred solvent, the specific operation of the invention has been described in connection therewith. Solubility of sulfur under the preferred non-reacted conditions of the invention is, of course, important to the efficient operation of the invention under a wide variety of conditions of operation. Indeed, this is why benzene is the now preferred solvent. Other reasons might be given. Suffice to say that it is possible to operate the invention by replacing part or all of the benzene with another aromatic possessing good sulfur solubility. Included are such solvents as toluene, the xylenes, thiobenzene, diphenyl and their halogen substituted derivatives. Also oils, such as light cycle oils resulting from cracking of petroleum oil or other hydrocarbonaceous materials and which are therefore aromatic in character can be used. The medium, when it is non-organic, can be an aqueous alkali metal sulfite or bisulfite, for example, the sodium metal salt. When used in the well, it will usually be mixed with alkali metal hydroxide, for example, sodium hydroxide.

Mixtures of various solvents or media can be used. Variations will be within the scale of those possessed of the knowledge of this art having studied this disclosure.

As an example of light cycle oil which can be used, the following is given.

DISTILLATION TEST

| Fraction overhead, vol. percent | Boiling point range, °F. | Density G./cc. at 60 °F. | API |
|---|---|---|---|
| 0-30 | 415-468 | 0.89 | 27 |
| 30-60 | 468-490 | 0.90 | 25 |
| 60-90 | 490-537 | 0.92 | 22 |
| 90-100 | 537-606 | 0.94 | 19 |
| Total sample | | 0.9111 | 24 |

Total sulfur of orginal sample=1.37 wt. percent.

In a copending application Ser. No. 691,607 filed Dec. 18, 1967 by Oliver D. Crane, there is set forth a method for the recovery of sulfur and hydrogen sulfide from a stream of benzene containing the same which comprises flashing said stream to produce a vaporous stream containing hydrogen sulfide and some benzene and a bottoms stream containing sulfur and benzene, recovering hydrogen sulfide and benzene from said vaporous stream and subjecting said hydrogen sulfide to conditions to produce sulfur therefrom and fractionating said bottoms stream to recover benzene therefrom and sulfur yet containing some benzene.

Also in a copending application Ser. No. 691,493 filed Dec. 18, 1967 by William A. McClintock and Leo L. Politte, there is set forth a method for the recovery of sulfur and hydrogen sulfide from a solvent containing the same which comprises fractionating said solvent to produce a vaporous stream containing hydrogen sulfide and some solvent and a bottoms stream containing sulfur and solvent, recovering hydrogen sulfide and solvent from said vaporous stream, flashing said bottoms stream to obtain solvent vapor therefrom and a second bottoms stream, stripping said second bottoms stream to remove substantially all the remaining sulfur therefrom to thus obtain a solvent-free molten sulfur.

Reasonable variation and modification are possible within the scope of the foregoing disclosure, the drawing and the appended claims to the invention the essence of which is that there has been provided a method for producing a gas well and to prevent sulfur plugging thereof by circulating into and through and from the well a solvent or medium which removes sulfur and which carries sulfur to the surface, the medium being treated at the surface to recover therefrom the sulfur and hydrogen sulfide dissolved therein; in one embodiment of the invention an organic solvent being used within the well and said solvent being treated at the surface to convert sulfur therein to thiosulfate which is then separated from the solvent which now clean can be reused and in another embodiment or form of the invention the medium circulated into the well being a combination of a sulfite and a hydroxide substantially as set forth and described.

We claim:

1. A method for producing an acid-gas well containing free sulfur which comprises introducing into said well at least one of an aromatic solvent, an alkali metal sulfite and an alkali metal bisulfite medium, in which free sulfur is soluble and which will take into itself the free sulfur and then removing the solvent or medium from the well, separating gas from the solvent or medium, and then treating the solvent or medium to recover sulfur therefrom.

2. A method according to claim 1 wherein the solvent or medium is an aromatic in which sulfur is soluble and the solvent is treated at the surface to recover the sulfur therefrom.

3. A method according to claim 2 wherein the solvent is treated with an alkali metal sulfite and sodium hydride to convert sulfur in the solvent to thiosulfate which is separated as an aqueous solution from the solvent which then can be reused.

4. A method according to claim 1 wherein the solvent or medium is a mixture of an alkali metal sulfite or bisulfite, said sulfite or bisulfite being admixed with sodium hydroxide and the mixture is pumped into the well.

5. A method according to claim 1 wherein the solvent or medium is selected from benzene, toluene, thiobenzene, diphenyl, their halogen substituted derivatives, alkali metal sulfite or bisulfite and when a sulfite or bisulfite is used in the well, there being included alkali metal hydroxide.

References Cited

UNITED STATES PATENTS 2,688,368    9/1954    Rodgers et al. _____ 166—8
3,331,657    7/1967    Peter.

ERNEST R. PURSER, Primary Examiner

U.S. Cl. X.R.,

166—267